United States Patent
Voigt et al.

(10) Patent No.: US 9,756,652 B2
(45) Date of Patent: Sep. 5, 2017

(54) PREVENTING FREE-RIDING DATA TRAFFIC WHEN SCHEDULING UPLINK DATA

(71) Applicant: TELEFONAKTIEBOLAGET L M ERICSSON (PUBL), Stockholm (SE)

(72) Inventors: Lotta Voigt, Bromma (SE); Ann-Christine Eriksson, Enköping (SE); Maria Hulström, Stockholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/773,237

(22) PCT Filed: Mar. 14, 2013

(86) PCT No.: PCT/SE2013/050236
§ 371 (c)(1),
(2) Date: Sep. 4, 2015

(87) PCT Pub. No.: WO2014/142718
PCT Pub. Date: Sep. 18, 2014

(65) Prior Publication Data
US 2016/0014801 A1    Jan. 14, 2016

(51) Int. Cl.
*H04W 72/12* (2009.01)

(52) U.S. Cl.
CPC .... *H04W 72/1242* (2013.01); *H04W 72/1268* (2013.01); *H04W 72/1284* (2013.01)

(58) Field of Classification Search
CPC ......... H04W 72/1242; H04W 72/1284; H04W 72/1268
See application file for complete search history.

(56) References Cited

U.S. PATENT DOCUMENTS

2008/0176576 A1    7/2008  Diachina et al.
2011/0261747 A1*  10/2011  Wang ................... H04B 7/155
                                              370/315

(Continued)

FOREIGN PATENT DOCUMENTS

WO    2010094320 A1    8/2010

OTHER PUBLICATIONS

3GPP TSG-RAN WG2 LTE Adhoc, Jun. 30, 2006, R2-061864, pp. 1-4.*

(Continued)

*Primary Examiner* — Lakeram Jangbahadur
(74) *Attorney, Agent, or Firm* — Patents on Demand P.A.; Brian K. Buchheit; Scott M. Garrett

(57) ABSTRACT

A method performed by a communication network node is provided for scheduling of a User Equipment, UE, in a communication network which comprises the UE and the communication network node. The UE is arranged to communicate data on a plurality of bearers with the communication network node. In the method, one or more active bearers among the plurality of bearers are determined, the highest priority of the active bearers are determined, and a data transmission in uplink is scheduled for the UE based on the highest priority. By only taking active bearers in account when scheduling, UEs with non-active high priority bearer are prevented from performing free-riding traffic on lower prioritized bearers.

17 Claims, 4 Drawing Sheets

(56) References Cited

U.S. PATENT DOCUMENTS

2012/0069805 A1\* 3/2012 Feuersanger ..... H04W 72/1284
　　　　　　　　　　　　　　　　　　　　　　　370/329
2012/0281536 A1 11/2012 Gell et al.

OTHER PUBLICATIONS

3GPP TS 25.321 V11.1.0, 3rd Generation Partnership Project; Technical Specification Group Radio Access Network; Medium Access Control (MAC) protocol specification (Release 11); Jun. 2012, 198 pages.

Youjun, et al., Two-Level Buffer State Report Scheme for 3GPP LTE System, Wireless Communications, Networking and Mobile Computing, Sep. 24, 2009, WICOM '09, IEEE, Piscataway, NJ USA, 6 pages.

Lucent Technologies, Improved QoS handling for UL scheduling, 3GPP TSG-RAN WG2 Meeting #54, R2-062226, Aug. 28-Sep. 1, 2006, Tallinn, Estonia, 4 pages.

Ericsson, Feasibility of better than per UE based UL scheduling in LTE, 3GPP TSG-RAN WG2 LTE Adhoc, R2-061864, Jun. 27-30, 2006, Cannes, France, 4 pages.

Ericsson, On the Granularity of Uplink Scheduling in LTE, 3GPP TSG RAN WG2—Ad-Hoc on LTE, R2-061863, Jun. 27-30, 2006, Cannes, France, 4 pages.

\* cited by examiner

PREVENTING FREE-RIDING DATA TRAFFIC WHEN SCHEDULING UPLINK DATA

TECHNICAL FIELD

The present disclosure relates generally to a method and an apparatus for scheduling in communication networks, especially for scheduling of uplink data in wireless communication networks.

BACKGROUND

In wireless communication networks, a user uses a UE (User Equipment) for communicating with a RAN (Radio Access Network). With the emergence of available services, the users increase their data traffic and requests more efficient UE:s. One type of more efficient UE which has been developed is multiple bearers UE, i.e. UE:s applying more than one radio bearers each in their communication with the wireless communication network node.

In this description, the term "User Equipment" will be used to denote any suitable communication terminal adapted to communicate with a radio base station. A UE, may be implemented as a mobile phone, a PDA (Personal Digital Assistant), a handheld computer, a laptop computer, etc. A "radio base station" may be implemented as a NodeB, an eNodeB, a repeater, etc.

"Scheduling" is a process for controlling which UE:s that shall be allowed to communicating data with a base station in a radio access network. This description relates to communication of data in uplink and the described processes will be in accordance with communication of data in uplink. The scheduler is present in a radio base station and in uplink the scheduler receives requests to transmit from the UE:s which the UE:s are communicating with. In response to the requests, and based on parameters as: the amount of data to be transmitted in uplink, the available capacity for uplink data, etc., the scheduler allocates communication capacity for communication of data in uplink and distributes scheduling grants to the UE:s accordingly. When having received a scheduling grant, the UE transmits data in uplink according to the scheduling grant. The UE:s are also capable of notifying the scheduler of their needs for communication resources in uplink, and may indicate whether they are happy or not with the assigned grants or with buffer status. In WCDMA networks, for instance, a specific so called "happy-bit" may be set when requesting to be scheduled, for indicating that the UE requires to transmit data in uplink at a higher data rate, i.e. a UE requires to be scheduled more frequently, or at an increased data rate. In downlink the situation is different, the scheduling is there initiated by the radio access network and not by the UE, and will not be further discussed in this description.

The term "Radio Bearer" is used throughout this description to denote radio resources being set up and applied of a UE for communicating data between the UE and a RAN. The term "Radio Access Bearer", also abbreviated as RAB is a term denoting a logic communication resource between the UE and a core network.

With reference to FIG. 1, a scenario where a multi bearer UE transmits uplink data to a radio access network will now be described.

A UE 100 communicates data with a radio access network 102. The radio access network comprises a radio base station 104 and a radio network controller 106, and the radio access network 102 is connected to a core network 108. The UE 100 is a multiple bearer UE and applies two radio bearers B1, B2 for the communication. The UE 100 which wants to transmit data in uplink, requests a scheduler (not shown) in the radio access network 102 to be scheduled to transmit data. When scheduling, the scheduler decides which UE to be granted to transmit data in uplink. The scheduler bases its decision on parameters as: available communication capacity for uplink, the transmission needs in uplink and required QoS (Quality of Service) for all UE:s.

Commonly, in wireless communication networks, there are limited resources for communicating data, especially in uplink. Therefore, the operators of wireless communication networks assign the radio bearers various priorities, e.g. a UE may have one prioritised radio bearer and one non-prioritised radio bearer. Thereby, the operators are enabled to reserve prioritised radio bearers for desired services. For instance, the prioritised radio bearers will be reserved for voice and video services and the low-prioritised radio bearers will be used for less desired services, or services which not require real-time characteristics, e.g. SMS (Short Message Service), file downloading, peer-to-peer networking, etc. To enable a scheduler to perform allocation of communication resources, scheduling information is communicated between the UE:s and the radio access network. An accurate scheduling requires a substantial amount of scheduling information, which causes increased signalling load on the air interface.

There is a need to fairly and accurate allocate available communication resources to the UE:s in a wireless communication network, without increasing the amount of scheduling information.

SUMMARY

It would be desirable to achieve fair and efficient usage of available communication resources in uplink in radio access networks. It is an object of the described solution to address at least some of the issues outlined above. Further, it is an object to provide a mechanism for enabling fair allocation of communication resources in uplink. These objects and others may be met by a method and a communication network node according to the attached independent claims.

According to one aspect a method performed by a communication network node is provided for scheduling of a User Equipment, UE, in a communication network which comprises the UE and the communication network node. The UE is arranged to communicate data on a plurality of bearers with the communication network node. The method comprises to determining one or more active bearers among the plurality of bearers, to determining the highest priority of the active bearers, and to scheduling a data transmission in uplink for the UE based on the highest priority. By only taking active bearers in account when scheduling, UEs with non-active high priority bearer are prevented from performing free-riding traffic on lower prioritised bearers.

In one exemplifying embodiment the method may further comprise to detecting data transmission on one or more of the plurality of bearers, and determining the active bearers as the bearers on which data transmission is detected. Furthermore, the detected data transmission may be at least one of transmission in uplink and transmission in downlink. Moreover, the bearers may be determined to be active when data transmission was detected at the latest at a time $t_A$, where $0 \leq t_A \leq T_A$, on the respective bearers, and the bearers are determined to be inactive when $t_A > T_A$, where $T_A$ is a pre-defined threshold, preferably $1\ ms < T_A < 10\ ms$. By registering the time $t_A$ when data transmission was detected at the latest, and changing status to non-active first when $t_A$ is above a specific threshold $T_A$, short interruptions will be prevented from changing statuses to inactive, and more stable conditions is achieved.

In another exemplifying embodiment, the method may further comprise to determining which services being carried out on one or more of the active bearers and, wherein the scheduling is further based on which services being carried out. By determining which services that are carried out, the communication network node is enabled to prioritise one UE before another UE, who both have active highest prioritised bearers. Thereby the communication network node may be further more appropriate when preventing free-riding. Moreover, by determining which services being carried out, bearers performing less prioritised services may have their data communication rates reduced, e.g. by rate shaping, in order to achieve fair allocation of communication resources.

According to another aspect a communication network node is provided for enabling scheduling of a User Equipment, UE, in a communication network which comprises the UE and the communication network node, where the UE is arranged to communicate information on a plurality of bearers with the communication network node. The communication network node comprises a first communication unit adapted to receive uplink data on one or more of the plurality of bearers, and a determination unit adapted to determine one or more active bearers among the plurality of bearers, and determine the highest priority of the active bearers. The communication network node comprises also a scheduler adapted to scheduling a grant of the UE based on the highest priority.

In one exemplifying embodiment, the determination unit may comprise an activity detector adapted to detect data transmission on the plurality of bearers, and a priority determiner adapted to determine which of the active bearers having the highest priority. The communication network node may further comprise a clock adapted to register a time $t_A$ since data transmission in any of uplink and downlink was detected at the latest for each of the plurality of bearers, the determination unit being further adapted to determine that the bearers are active when data transmission was detected at the latest at the time $t_A$, where $0 \leq t_A \leq T_A$, on the respective bearers, and determine that the bearers are inactive when $t_A > T_A$, where $T_A$ is a pre-defined threshold, preferably 1 ms $< T_A <$ 10 ms.

In another exemplifying embodiment, the communication network node may further comprise a service detector adapted to detecting which services being carried out on the respective of the active bearers. When detecting services, the service detector may apply any of: service information received from a core network to which the communication node is associated, and packet inspection on data transmitted on the bearers. The communication network node may be implemented as a NodeB, or an eNodeB, and the communication network may be any of CDMA, WCDMA, LTE, and LTE Advanced.

BRIEF DESCRIPTION OF DRAWINGS

The solution will now be described in more detail by means of exemplary embodiments and with reference to the accompanying drawings, in which.

DETAILED DESCRIPTION

Figure 1:
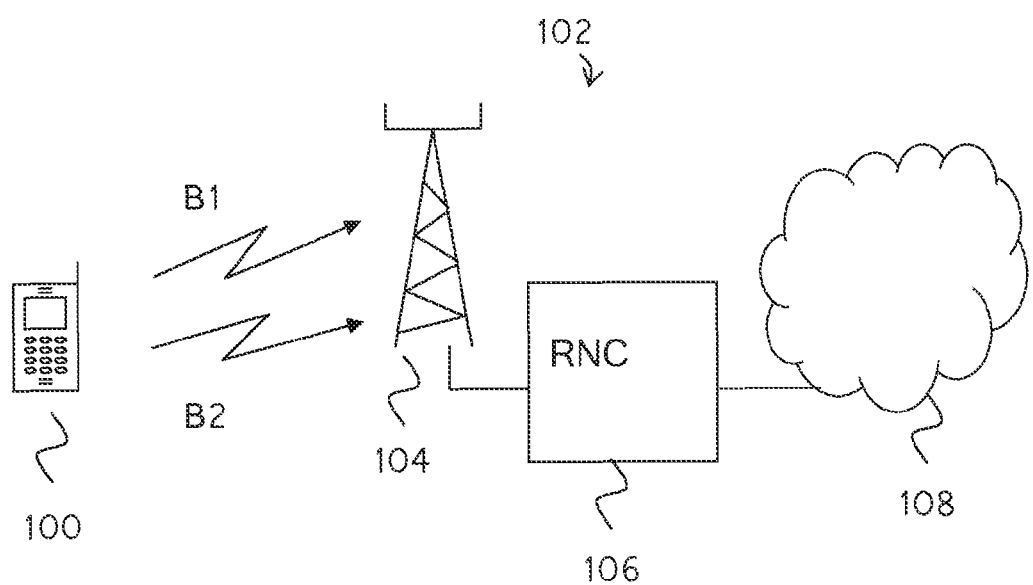
FIG. 1 is an environmental view illustrating a wireless communication system, according to the prior art.

Briefly described, a solution is provided which will achieve an effective utilise of available communication resources in uplink in a wireless communication network.

When using multiple bearers UE:s, the scheduler may be designed to schedule UE:s which request to transmit data in uplink for prioritised services before UE:s requesting to transmit data in uplink for less prioritised services, i.e. services for which prioritised radio bearers are used before services for which less prioritised radio bearers are used. When scheduling, the schedulers calculate and give grants per UE, but the UE:s requesting to be scheduled request a specific QoS (Quality of Service) per radio access bearer, and thereby indirectly per radio bearer. However, prioritising UE:s based on services/radio bearers, as described above, enables abuse/misuse of the communication resources. For instance, a UE or a user of a UE who wants to perform a less prioritised service but wants to be scheduled according to a prioritised service may start a more prioritised service before starting the less prioritised service. The UE/user will then be scheduled according to the prioritised service when performing the less prioritised service, so called free riding, with a disregard for other users.

The scheduler may in addition use further scheduling information in order to limit free riding traffic, e.g. receiving information regarding the amounts of data to be transmitted in uplink per requested service. However, to achieve an appropriate scheduling, such scheduling information has to be sent frequently, which causes unnecessary signalling load on the air interface. In situations with high data load when service differentiation would be most needed, this additional signalling load will be substantial.

Briefly described, a solution is provided which will achieve an effective use of available communication resources in uplink, and prevents free-riding data traffic in uplink.

By detecting which radio bearers that are active and use priorities of active radio bearers who request to be scheduled as a basis for a scheduling decision, a scheduler is enabled to allocate communication capacity in uplink to UE:s on which more prioritised services are performed at the cost of UE:s on which less prioritised services are performed. In other words, the scheduler will schedule UE:s with more prioritised services more frequently and/or at an higher data rate than UE:s with less prioritised services.

Commonly, in wireless communication networks there are limited resources for communicating data, especially in uplink, and there is a need for an accurate and fair allocation of the available communication resources. When A UE has multiple radio bearers, the radio bearers are assigned different priority levels. For instance such a UE has two radio bearers, one prioritised and one less prioritised. Which radio bearer that is used may be configured by the operators or be decided by the wireless communication networks based on the operators configurations. For instance, the operators may influence the communication network to apply the prioritised bearers for higher prioritised services which often require high QoS (Quality of Services), e.g. speech and real-time video, while lower prioritised services or services which often require lower QoS, e.g. file downloading, peer-to-peer networking, etc., have to be performed on the less prioritised radio bearers.

To calculate a fair grant for uplink transmission based on the transmission need per radio bearer and its QoS, the scheduler which is present in the RAN needs to know which UE:s that have data to transmit. The UE sends scheduling information to the RAN regarding its transmission needs.

When scheduling, a UE receives a grant to transmit data based on the priority level of its highest prioritised active radio bearer and the amount of data in the UE buffer.

Figure 2:
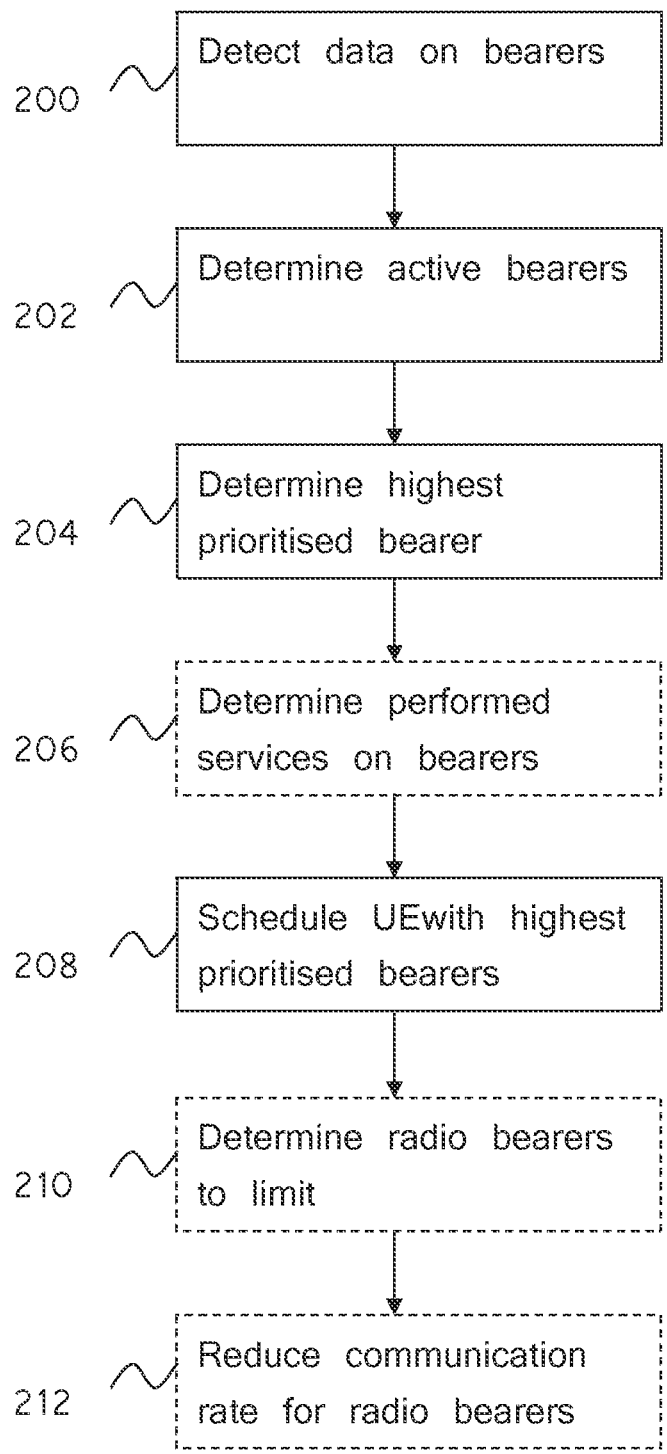
FIG. 2 is a flow chart illustrating a procedure in an arrangement, according to possible embodiments.

With reference to FIG. 2, which is a schematic flow chart, a method for scheduling a UE to transmitting data in uplink to a communication network node in a radio access network will now be described in accordance with an embodiment example. Even if, in this exemplifying embodiment, the communication network node is implemented as a NodeB and the RAN is a CDMA network, the concept is not limited thereto. The concept may be applied also in other suitable communication networks, e.g. in WCDMA or LTE based networks.

A multiple bearers UE is arranged to transmit data in uplink on a plurality of radio bearers to the NodeB in a radio access network to which the UE is associated. In a first action 200, the NodeB detects transmission of data on the radio bearers. Then, based on whether or not data transmission is detected, the NodeB determines which of its plurality of bearers those are active or non-active, in a following action 202. In a subsequent action 204, the NodeB determines the highest priority among the active radio bearers. In this exemplifying embodiment, the radio bearers are divided in four priority levels "1-4", where "1" is the highest and "4" is the lowest priority level. It is to be noted that the concept is not limited to the selected priority levels "1-4", a that a designer instead may select any other suitable number of priority levels when implementing, e.g. 5 levels where "1" is the lowest priority level and "5" the highest, or "A-D", etc.

In another action 208, performed after action 204, the NodeB schedules the UE for transmitting data in uplink, based on the highest prioritised radio bearers. The scheduling process is performed in accordance with known standards and will not be described in more detail in this description.

By continuously monitoring data transmission on the radio bearers, and determine them as active/non-active, a more actual and up-dated basis for the scheduling decision is achieved, i.e. radio bearers which no longer are active is not taken in account and radio bearers which turns active will be taken in account.

In another exemplifying embodiment, which is based on the above described embodiment, in addition, the Node B analyses which services being carried out on the radio bearers of the multiple bearers UE:s, in another action 206. The analysis may be performed by applying so called packet inspection. The analysis of services may be performed before, simultaneously, or after the determination of the highest priority, but before the scheduling. By analysing/determining the services which are performed on the radio bearers and applying the result thereof as a further basis when defining the radio bearer priorities and thereby the UE priorities, a more appropriate scheduling may be achieved. For instance, if two multiple bearers UE:s are performing different services on equally prioritised respective radio bearers of the UE:s, the knowledge of which services that are performed enables the scheduler to select the UE with the highest prioritised service to be scheduled first. Thereby, a more fair and appropriate scheduling may be achieved.

In another exemplifying embodiment which is based on some of the above described embodiments, in addition, the NodeB determines one or more candidates among the active radio bearers in an action 210, to get their communication rates in uplink reduced in a subsequent action 212. When determining candidates, the NodeB ranks the active radio bearers according to their priority levels. As stated above in another exemplifying embodiment, the services being carried out on the respective radio bearers may be determined. The priority levels of the radio bearers may be adjusted according to which services being carried out on them.

It is to be noted that determining candidates to get their communication rates reduced, may be performed as well for one multiple bearers UE which has both lower prioritised and higher prioritised radio bearers, as for a plurality of multiple bearers UEs.

Reducing the communication rates in action 212, may be performed by applying so called "Rate shaping", where the RAN forces an application program in the UE to slow down the candidate radio bearers. Typically, lower prioritised radio bearers will be rate shaped. However, the priorities of the radio bearers may be adjusted based on which services being carried out on them. Therefore, the available communication resources in uplink may be restricted for less prioritised services and instead be allocated to more prioritised services, in order to achieve a further more appropriate allocation of the communication resources. It is to be noted that the NodeB is not limited to perform a specific ranking of services when determining candidates in action 210. The priorities of the radio bearers may be determined according to any suitable performed or pre-determined ranking, e.g. based on which services being carried out, or their QoS requirements.

With reference to Table 1 and FIG. 2, a scenario will be illustrated where two multiple bearers UE:s are using three radio bearers each. The first UE UE1 uses two of its radio bearers RB1 (UE1), RB2 (UE1), RB3 (UE1) to communicate data in uplink and the second UE UE2 uses three radio bearers RB1 (UE2), RB2 (UE2), RB3 (UE2) to communicate data in uplink. When applying the above described process, the NodeB determines that the radio bearers RB2 (UE1), RB3 (UE1), RB1 (UE2), RB2 (UE2) and RB3 (UE2) are active, i.e. action 202. The NodeB determines further that RB3 (UE1) and RB1 (UE2) have equal highest priority level "2", i.e. action 204 in the embodiments above. As long as there is only one UE having an active radio bearer with the highest priority level, the NodeB schedules this UE accordingly in action 208.

However, there are situations where two or more UE:s UE1, UE2 have active radio bearers with equal and highest priority level. In order to determine which of the UE:s UE1, UE2 that will be scheduled, the Node B then determines which services that are performed on the radio bearers RB3 (UE1) and RB1 (UE2), i.e. action 206. Based on which services being detected, e.g. the NodeB decides that voice will be scheduled before video and schedules UE2 first, i.e. action 208.

In situations where the available communication resources in uplink are limited and when the bearer with the highest priority is active on the same time as a lower priority bearer the UE will get the priority of the high priority bearer and therefore there may be a need to reduce the rate of the lower priority bearer in order to avoid that it gets a free ride. In order to allocate communication resources from less prioritised services to more prioritised services, the NodeB determines which services that are performed on the active radio bearers, and identifies that radio bearer RB2 (UE1)

performs Peer-to-peer networking, RB3 (UE2) e-mailing, etc., i.e. action 210. Based on knowledge of which services being performed on the radio bearers, the NodeB may adjust the priority of radio bearers before identifying one or more candidates among the radio bearers to get their communication rate reduced.

The identification may be performed by so called packet inspection, e.g. Shallow packet inspection. In this scenario, the NodeB selects the lowest prioritised radio bearer RB2 (UE1) (peer-to peer) as candidate, and reduces its communication rate by applying rate shaping. It is to be noted that further candidates may be selected if needed, e.g. RB3 (UE2), and RB2 (UE2). Thereby, a fair allocation of available communication resources is achieved. In addition, by determining the services being carried out, lower prioritised radio bearers of a specific UE may be prevented from performing less prioritised services simultaneously as a more prioritised radio bearer of the specific UE performs a more prioritised service and thereby free ride from low priority bearers (and services) is prevented.

According to the described example, the UE2 will be scheduled according of its highest prioritised active radio bearer RB1 (UE2) (priority level "2") even if UE1 has a non-active higher prioritised radio bearer RB1 (UE1) (priority level "4"). Free-riding communication in uplink of UE1 is thereby prevented, e.g. peer-to-peer networking. Moreover, eventual free-riding of the active radio bearers RB2 (UE2) (priority level "3") and RB3 (UE2) (priority level "3") when the radio bearer RB1 (UE2) (priority level "2") is scheduled may in addition be prevented by determining the services being performed, as described above.

TABLE 1

| UE | RB | Active | Priority | Service |
|---|---|---|---|---|
| UE1 | RB1 | | 1 | |
| | RB2 | Active | 4 | Peer-to-peer |
| | RB3 | Active | 2 | Video |
| UE2 | RB1 | Active | 2 | Voice |
| | RB2 | Active | 3 | instant messaging |
| | RB3 | Active | 3 | E-mail |

For instance, if two multiple bearers UE:s are determined to be active, the first UE having the priority level "3" on one of its radio bearers and the second UE having the priority level "4" on one of its radio bearers, the second UE will be scheduled to transmit data in uplink first.

Figure 3:
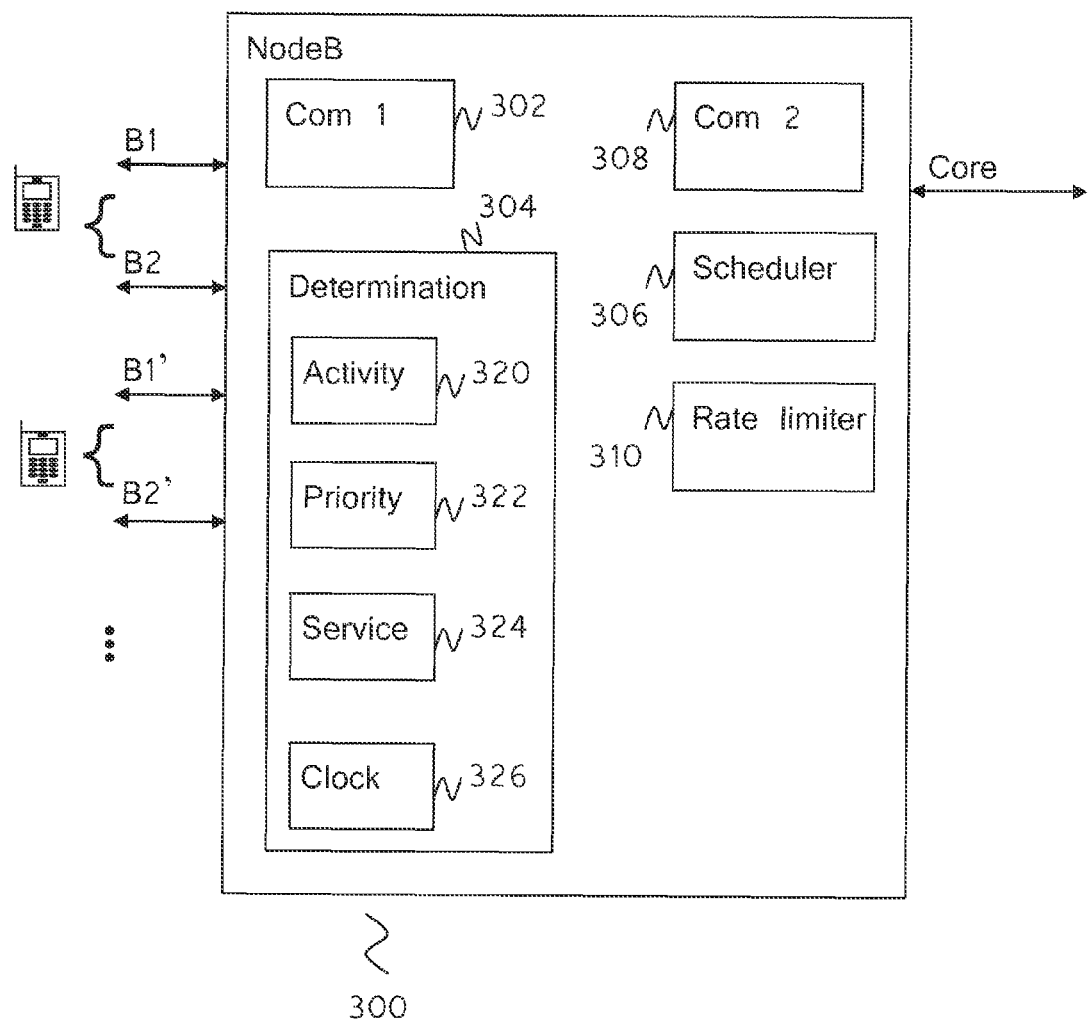
FIG. 3 is a block diagram illustrating a node for uplink scheduling, according to some possible embodiments.

With reference to FIG. 3, which is a schematic block diagram, a communication network node adapted to perform uplink scheduling of multiple bearers UE:s associated to the communication network node via a plurality of radio bearers will now be described in accordance with an exemplifying embodiment. A radio base station in a WCDMA network is implemented as a NodeB 300 and comprises a first communication unit 302, an activity determination unit 304, a scheduler 306, and a second communication unit 308.

The NodeB 300 is arranged to receive data in uplink via a radio access network (not shown) on two respective radio bearers B1/B2, B1'/B2', with UE:s associated with the NodeB 300. The first communication unit 302 is adapted to receive uplink data on the radio bearers B1, B2, B1', B2'. Furthermore, the first communication unit 302 provides scheduling grants to the UE:s when they are scheduled, which is described above in another exemplifying embodiment.

The determination unit 304 is adapted to determine which of the radio bearers B1, B2, B1', B2' that are active and a priority level of the radio bearers B1, B2, B1', B2' which are detected active. The determination unit 304 comprises an activity detector 320 adapted to detect when data is communicated on any of the radio bearers B1, B2, B1', B2', i.e. when data is detected on a radio bearer, the radio bearer is determined to be active. The determination unit 304 comprises also a priority determiner 322, which is adapted to determine which of the active radio bearers that have the highest priority level.

The scheduler 306 is adapted to receive information from the priority determiner 322 regarding the priority of the UEs for transmission of data in uplink and scheduling this UE accordingly. The actual scheduling process is performed with ordinary methods and is therefore not described in more detail in this description.

The second communication unit 308 is adapted to communicate received data in uplink to the core network. Data may be communicated to the core network via other communication network nodes, e.g. a radio network controller (not shown).

In another exemplifying embodiment which is based on some above described embodiments, in addition, the determination unit 304 comprises a service detector 324, adapted to detect which services that are carried out on the different radio bearers B1, B2, B1', B2'. The service detector applies any suitable method of detecting the services, e.g. service information received from the core network, or any form of packet inspection as shallow packet inspection, deep packet inspection, etc. By analysing which services being carried out on the radio bearers which are determined to be active and have equal priority levels, the NodeB 300 is enabled to prioritise UE:s performing specific services over UE:s performing other services when scheduling, e.g. services with stricter latency requirements before other services.

In another exemplifying embodiment which is based on some above described embodiments, in addition, the determination unit 304 comprises a clock 326 which is adapted to register a time $t_A$ when specific radio bearers B1, B2, B1', B2' where active at the latest. By applying knowledge of when a specific radio bearer was active at the latest $t_A$, the determination unit 304 may consider the specific bearer as active also a short time after the latest detected activity on the specific bearer, i.e. when $t_A$ is below a specific threshold $T_A$ ($t_A<T_A$). Thereby, short interruptions of data will be prevented from changing the status of the radio bearers from active to passive, and a more stable condition for the scheduling process may be achieved. For instance, 1 ms<$T_A$<10 ms The determination unit 304 may further be adapted to store time characteristics regarding detected activity of uplink communication on radio bearers and predict future activity of communication in uplink. By predicting activity on specific radio bearers, the scheduler 306 may consider upcoming uplink activity on specific radio bearers when scheduling, which may be used to raise the scheduling priority of the UE in time for the new transmission in order to secure for low latency for all packets on the high priority radio bearer.

In yet another exemplifying embodiment which is based on some above described embodiments, in addition, the NodeB 300 comprises a rate limiter 310, which is adapted to limit data rates on radio bearers. The NodeB 300 may for instance decide to limit communication rates in uplink for less desired services when the total communication capacity in uplink is limited. As basis for such a decision the NodeB 300 may obtain and apply information regarding which services being carried out on the bearers from the service identifier 324. Typically, data is transmitted in accordance with TCP, and the rate limiter 310 may apply rate shaping to limit transmission rate on specific radio bearers. However, a designer is not limited to TCP and may select any other suitable transmission protocol when appropriate, as e.g. UDP (User Datagram Protocol). In this exemplifying embodiment the rate shaper 310 is arranged in the NodeB 300, however, a designer realises that the rate limiter may be arranged alternatively within the concept, e.g. in a radio network controller or any other suitable communication network node where the traffic flow is accessible. By applying a rate limiter, the NodeB is enabled to limit transmission rates on radio bearers on which less prioritised services are performed. Thereby, allocation of communication resources may be further optimised, and increased fairness may be achieved.

It should be noted that FIG. 3 illustrates various functional units in the NodeB 300 and the skilled person is able to implement these functional units in practice using suitable software and hardware. Thus, the solution is generally not limited to the shown structures of the NodeB 300, and the functional units 302-326 may be configured to operate according to any of the features described in this disclosure, where appropriate. For instance, any functionality in a specific functional unit may be placed in another suitable functional unit, where appropriate, e.g. the rate shaper 308 may be placed in a radio network controller (not shown).

Even if communication in uplink is described in this embodiment. However, a designer of the NodeB is not limited thereto, he/she understands how to modify the described NodeB in order to enable communication also in downlink.

It should be noted that FIG. 3 merely illustrates various functional units in the node 300 in the first network domain in a logical sense. The functions in practice may be implemented using any suitable software and hardware means/circuits etc. Thus, the embodiments are generally not limited to the shown structures of the node 300 in the first network domain and the functional units. Hence, the previously described exemplary embodiments may be realised in many ways. For example, one embodiment includes a computer-readable medium having instructions stored thereon that are executable by a control or processing unit (not shown) for executing the method steps in the node 300 in the first network domain. The instructions executable by the computing system and stored on the computer-readable medium perform the method steps of the node 300 in the first network domain as described above.

Figure 4:
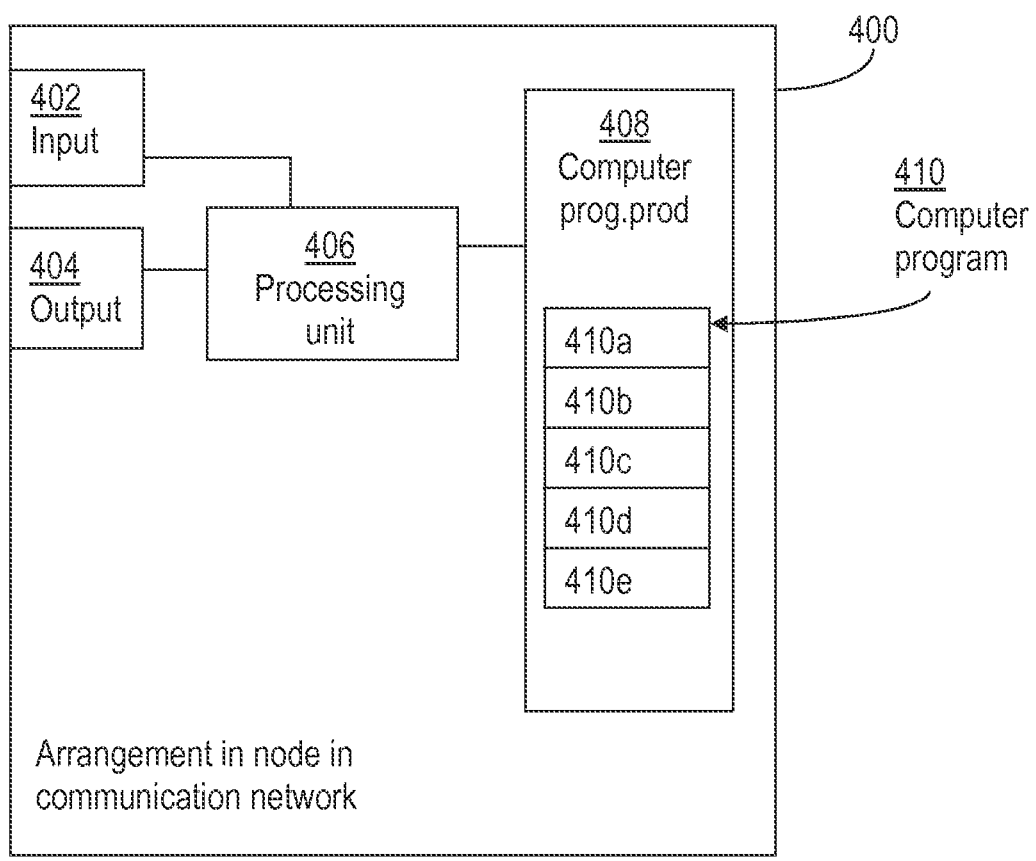
FIG. 4 is a block diagram illustrating the node for uplink scheduling, according to some possible embodiments.

With reference to FIG. 4, which is a schematic block diagram, an arrangement 400 in a communication network node in a first network domain will now be described in accordance with an exemplifying embodiment. Comprised in the arrangement 400 in the node is here a processing unit 406, e.g. with a DSP (Digital Signal Processor). The processing unit 406 may be a single unit or a plurality of units to perform different actions of procedures described herein. The arrangement 400 in the node in the first network domain may also comprise an input unit 402 for receiving signals from other entities, and an output unit 404 for providing signal (s) to other entities. The input unit and the output unit may be arranged as an integrated entity or as illustrated in the example of FIG. 3, as one or more interfaces 302/308.

Furthermore, the arrangement 400 in the node comprises at least one computer program product 408 in the form of a non-volatile memory, e.g. an EEPROM (Electrically Erasable Programmable Read-Only Memory), a flash memory and a hard drive. The computer program product 408 comprises a computer program 410, which comprises code means, which when executed in the processing unit 406 in the arrangement 400 in the node causes the arrangement 400 in the node to perform the actions e.g. of the procedure described earlier in conjunction with FIG. 2.

The computer program 410 may be configured as a computer program code structured in computer program modules 410a-410e. Hence, in an exemplifying embodiment, the code means in the computer program of the arrangement 400 in the node may comprise a first communication unit 410a, or module, for receiving, from a UE, transmission of data in uplink. The computer program may further comprise a determining unit 410b, or module, for determining a highest priority. The computer program may further comprise a scheduling unit 410c, or module, for scheduling in uplink. The computer program may further comprise a rate limiting unit 410d, or module, for limiting transmission rate of a radio bearer. The computer program may further comprise a second communication unit 410e, or module, for transmitting data in uplink to a core network.

The computer program modules could essentially perform the actions of the flow illustrated in FIG. 2, to emulate the node 300 of FIG. 3. In other words, when the different computer program modules are executed in the processing unit 406, they may correspond to the units 302-310 of FIG. 3.

Although the code means in the examples disclosed above in conjunction with FIGS. 3 and 4 may be implemented as computer program modules which when executed in the processing unit causes the node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the node in the first network domain.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

By only considering active radio bearers for multiple radio bearer UE:s, when scheduling, the NodeB is enabled to prevent multiple bearer UE:s, who have non-active high prioritised bearers, from performing free-riding less prioritised services on lower prioritised radio bearers. Thus, even if the free-riding UE starts a prioritised service on a highest prioritised radio bearer in advance, in order to be better scheduled for a less prioritised service, the NodeB detects when the free-riding user stops using the highest prioritised radio bearer, and will no longer scheduling the free-riding UE according to the highest prioritised radio bearer which then is non-active.

In some of the above described embodiment examples, the radio base stations detect transmission of data in uplink. However, a NodeB is not limited thereto, and a designer is free to select communication in downlink instead when devising the method within the concept. For instance, when communicating data in uplink in accordance with TCP (Transmission Control Protocol), acknowledgements are transmitted in downlink, and data communicated in downlink may be an indication of uplink activity.

Furthermore, it is to be understood that the communication network nodes described above in this description also comprises additional conventional means providing functionality, such as e.g. various control units and memories, necessary for enabling common functions and features to operate properly. However, for simplicity reasons, any means or functionality which is not necessary for the understanding of the proposed enabling of the uplink scheduling services has been omitted in the figures, and will not be discussed in any further detail in this description. Similarly, it is to be understood that the described processes for enabling scheduling priority in uplink are schematically described, e.g. conventional actions and calculations of the scheduling are omitted.

ABBREVIATIONS

CDMA Code Division Multiple Access
LTE Long Term Evolution
QoS Quality of Service
RAB Radio Access Bearer
RAN Radio Access Network
TCP Transmission Control Protocol
UE User Equipment
WCDMA Wideband CDMA

The invention claimed is:

1. A method performed by a communication network node for scheduling of a User Equipment (UE) in a communication network comprising:
the UE and the communication network node, where the UE is arranged to communicate data on a plurality of bearers with the communication network node, the method comprising:
detecting data transmission on one or more of the plurality of bearers, and determining one or more active bearers as bearers on which data transmission is detected;
determining the one or more active bearers among the plurality of bearers, wherein determined ones of the bearers are determined to be active when data transmission is detected at the latest at a time $t_A$, when $0 \leq t_A \leq T_A$, on the respective ones of the plurality of bearers, and other ones of the plurality of bearers are determined to be inactive when $t_A > T_A$, wherein $T_A$ is a pre-defined threshold, wherein the pre-defined threshold TA varies between 1 ms<TA<10 ms,
determining a highest priority of the active bearers, and scheduling a data transmission in uplink for the UE based on the highest priority.

2. The method according to claim 1, wherein the detected data transmission is at least one of transmission in uplink and transmission in downlink.

3. The method according to claim 1, wherein the determining of the active bearers from the plurality of bearers is based on a history of data transmission on the respective ones of the plurality of bearers.

4. The method according to claim 1, further comprising determining which services being carried out on one or more of the active bearers and, wherein the scheduling is further based on which services being carried out.

5. The method according to claim 4, wherein the determining of services is performed by applying packet inspection on one or more of the plurality of active bearers, or by applying service information received from a core network to which the communication network node is associated.

6. The method according to claim 1, further comprising determining at least one candidate of the active bearers to have their respective data communication rates reduced based on the highest priority of the active bearers, and reducing the data communication rate for the candidate accordingly.

7. The method according to claim 6, wherein the reducing the data communication rates is performed by applying rate shaping.

8. The method according to claim 1, wherein the communication network is one of CDMA, WCDMA, LTE, and LTE Advanced, and the communication network node is implemented as a radio base station, the radio base station comprising a NodeB or an eNodeB.

9. A communication network node for enabling scheduling of a User Equipment (UE) in a communication network comprising:
the UE and the communication network node, where the UE is arranged to communicate information on a plurality of bearers with the communication network node, the communication network node comprising a memory and a processor coupled to the memory,
wherein the processor configured to:
receive uplink data on one or more of the plurality of bearers,
determine one or more active bearers among the plurality of bearers, and determine a highest priority of the active bearers, wherein the bearers are determined to be active when data transmission is detected at the latest at a time $t_A$, when $0 \leq t_A \leq T_A$, on the respective bearers, and the bearers are determined to be inactive when $t_A > T_A$, wherein $T_A$ is a pre-defined threshold, wherein the pre-defined threshold $T_A$ varies between 1 ms<$T_A$<10 ms,
register the time $t_A$ since data transmission in any of uplink and downlink was detected at the latest for each of the plurality of active bearers, and
schedule a grant of the UE based on the highest priority.

10. The communication network node according to claim 9, wherein the processor is configured to detect data transmission on the plurality of active bearers, and determine which of the active bearers has the highest priority.

11. The communication network node according to claim 9, wherein the processor is further configured to, for each of the active bearers, store the time $t_A$, and predict ones of the plurality of bearers as active based on a history of the respective time $t_A$.

12. The communication network node according to claim 9, wherein the processor is further configured to detect which services being carried out on the respective of the active bearers, and when more than one of the active bearers have equal and highest priority level, based on the services being carried out, select one of the active bearers having the highest priority level to schedule.

13. The communication network node according to claim 12, wherein the processor is configured to apply any of: service information received from a core network to which the communication node is associated, and packet inspection on data transmitted on the active bearers, when detecting the services.

14. The communication network node according to claim 12, wherein the processor is further configured to reduce transmission rates of the active bearers, and based on which services being carried out on the active bearers, determine one or more of the active bearers to get their transmission rates reduced.

15. The communication network node according to claim 9, wherein the communication network is one of CDMA, WCDMA, LTE, and LTE Advanced, and the communication network node is implemented as a radio base station, the radio base station comprising a NodeB or an eNodeB.

16. The communication network node according to claim 9, wherein the plurality of bearers carry data in accordance with Transmission Control Protocol (TCP) or User Datagram Protocol (UDP).

17. A non-transitory computer readable medium comprising executable instructions stored in a memory and executed by a processor for scheduling of a User Equipment (UE) in a communication network node comprising:
  the UE and the communication network node, where the UE is arranged to communicate data on a plurality of bearers with the communication network node,
  wherein, when the executable instructions are executed in the communication network node by the processor, causes the processor to:
  detect data transmission on one or more of the plurality of bearers, and determine one or more active bearers as bearers on which data transmission is detected;
  determine the one or more active bearers among the plurality of bearers, wherein determined ones of the bearers are determined to be active when data transmission is detected at the latest at a time $t_A$, when $0 \leq t_A \leq T_A$, on the respective ones of the plurality of bearers, and other ones of the plurality of bearers are determined to be inactive when $t_A > T_A$, wherein $T_A$ is a pre-defined threshold, wherein the pre-defined threshold TA varies between 1 ms<TA<10 ms,
  determine a highest priority of the active bearers, and
  schedule a data transmission in uplink for the UE based on the highest priority.

* * * * *